United States Patent
Weijers et al.

(10) Patent No.: US 7,339,683 B2
(45) Date of Patent: Mar. 4, 2008

(54) METHOD OF MEASURING THE MOVEMENT OF AN INPUT DEVICE

(75) Inventors: Aldegonda Lucia Weijers, Eindhoven (NL); Martin Dieter Liess, Eindhoven (NL); Carsten Heinks, Eindhoven (NL); Arnoldus Johannes Martinus Joseph Ras, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 394 days.

(21) Appl. No.: 10/516,155

(22) PCT Filed: Jun. 4, 2003

(86) PCT No.: PCT/IB03/02474

§ 371 (c)(1),
(2), (4) Date: Nov. 30, 2004

(87) PCT Pub. No.: WO03/102751

PCT Pub. Date: Dec. 11, 2003

(65) Prior Publication Data

US 2005/0213106 A1    Sep. 29, 2005

(30) Foreign Application Priority Data

Jun. 4, 2002 (EP) ................. 02077217
Jun. 17, 2002 (EP) ................. 02077437

(51) Int. Cl.
*G01B 9/02* (2006.01)

(52) U.S. Cl. .................................. 356/519

(58) Field of Classification Search ........... 356/28.5, 356/496, 498, 519, 614; 250/221
See application file for complete search history.

(56) References Cited

U.S. PATENT DOCUMENTS

| 6,707,027 B2* | 3/2004 | Liess et al. ........... 250/221 |
| 2002/0093663 A1* | 7/2002 | Tsai .................... 356/498 |
| 2003/0016365 A1* | 1/2003 | Liess et al. ........... 356/498 |

FOREIGN PATENT DOCUMENTS

| EP | 0942285 A1 | 9/1999 |
| EP | 0942285 B1 | 9/1999 |
| WO | WO0237124 A1 | 5/2002 |
| WO | WO0237410 A1 | 5/2002 |
| WO | WO03037410 A1 | 5/2003 |
| WO | WO03102717 A2 | 12/2003 |

OTHER PUBLICATIONS

M. Liess et. al. A miniturized multidirectional optical motion sensor and input device based on laser self-mixing; Dec. 2002; pp. 2001-2006; vol. 13 No. 12.

* cited by examiner

*Primary Examiner*—Tu T Nguyen

(57) ABSTRACT

A method of and an input device for measuring scroll or click movement of an object and the input device relative to each other, includes determining the presence of the object on a window of the input device. Lower frequencies of an output signal from single sensor unit are separated and used for determining both the scroll and click motions. This allows measuring scroll movement and click movement with one sensor unit of the input device and reduction of costs and size of the input device.

28 Claims, 8 Drawing Sheets

METHOD OF MEASURING THE MOVEMENT OF AN INPUT DEVICE

The invention relates to a method of measuring movement of an object and a user's input device relative to each other, which movement comprises at least one a scroll movement or a click movement, whereby use is made of an input device comprising at least one optical sensor unit, whereby the measurement performed by the sensor unit comprises the steps of illuminating an object surface with a measuring laser beam, capturing measuring beam radiation reflected by the object by a diode laser cavity that emits the measuring beam and measuring changes in operation of the laser caused by interference of the re-entering measuring beam radiation and the optical wave in the laser cavity. The invention also relates to an input device for carrying out the method and to an apparatus comprising such an input device.

Such a method and user's input device (hereinafter input device) are known from PCT patent application WO 02/37410. The optical input device of WO 02/37410 is intended to be used, for example, in a handheld or laptop computer to move a cursor across a display, for example to select a function of a displayed menu. To select a function, or item, from a menu, a human finger (the object) is moved in a direction across a transparent window in the housing of the input device. This movement is called a scroll action. The direction of the click movement may be perpendicular to the direction of the scroll movement, for example. To activate the selected function the finger is moved in a direction perpendicular to said window. This movement is called a click action. The input device may be small, because the optical sensor units can be made very small. This opens the way to new applications for the input device. For example, a user's input function can be built in a mobile phone for selecting items of a menu and for accessing Internet pages, in other hand-held apparatus or in a notebook computer.

The scroll-and-click input measuring method and device of WO 02/37410 are substantially more reliable and simpler and cheaper than prior art methods and devices. Use is made of a concept that is new for the type of input devices discussed here. As will be explained herein after, this concept is a combination of Doppler shift a moving object, like a human finger, introduces in measuring laser beam and the so-called self-mixing effect in a diode laser, which supplies the measuring beam. Self-mixing is the phenomenon that radiation emitted by a diode laser and, after reflection from an object, re-entering the cavity of the diode laser induces a variation in the gain of the diode laser and thus in the radiation emitted by the laser. The scroll-and-click method and device of WO 02/37410 allow measuring both the speed and direction of the scroll movement and detecting a click action by means of two diode lasers measuring paths (sensor units), which are, for example, orientated at opposite sharp angles relative to window of the device. This method will be referred to as the vector decomposition method. The diode lasers may be supplied with periodically varying electrical currents and measuring signals generated during first and second half-periods may be compared to determine the direction of the scroll action.

It is an object of the invention to provide a new method of and a device for measuring scroll and click movement, which are even more simple and compact and cheaper than those of WO 02/37410. The method is characterized in that use is made of only one optical sensor unit for measuring a scroll movement and a click movement.

The new method is based on the insight that hitherto unused information in the measuring beam of a sensor unit can be used to detect the presence of a finger on the window of the input device. A single click action consists of a fast movement of the finger toward the device window and back and a click action is preceded and succeeded by time intervals wherein no movement takes place. Another possibility is: put the finger on the window, retract the finger and put it gain on the window. Between the movement towards the window and the movement from the window, the finger is resting on the window for a short time interval. If such a resting, or presence on the window, of the finger is detected, it can be concluded that a click action takes place. This detection can be performed by the sensor unit which measures scroll movement, so that a sensor unit and especially a diode laser can be saved. As the diode lasers are the most expensive components of the input device, the new method is substantially cheaper than the method which uses two sensor units, thus, two diode lasers. Saving one diode laser, moreover, means reducing the space, which should be reserved in the apparatus, which is provided with the capability to perform the method.

A first embodiment of the method is characterized in that the presence of an object on a window of the device is established by determining whether the re-entering measuring beam radiation comprises an amplitude component which changes at lower frequencies than amplitude changes caused by a scroll movement.

In the input device of WO 02/37410 the high-frequency component of the sensor output signal is used for determining both a scroll and a click action. In the first embodiment of the present method use is made of the insight that the low-frequency and DC portion of the output signal comprise useable information about the presence of a finger on the window of the input device, and thus about a possible click action being performed.

The first embodiment may be further characterized in that the lower frequency component is measured by means of an additional detector.

Alternatively the first embodiment may be characterized in that the lower frequency component is separated from the sensor output signal.

A second embodiment of the method is characterized in that the presence of an object on a window of the device is established by measuring variation in an electrical current for driving the diode laser.

If a finger is present on the device window the diode laser forms part of a feedback loop, which is closed by a measuring photo diode arranged, for example, at the rear side of the diode laser, and the self-mixing effect causes the efficiency of the laser to increase. This means that the laser drive current decreases when the finger is on the window.

A third embodiment of the method, wherein a periodically modulated measuring beam is used, is characterized in that the presence of an object on a window of the device is established by detecting presence of a pattern of output signal undulations, in periods corresponding in time with measuring beam pulse periods, which pattern is specific for the presence of the object on the window of the device.

This embodiment uses the unique feature of an optical input device employing the self-mixing effect that the presence of a finger on the window of the device causes a specific pattern of undulations in the sensor output signal. This specific pattern can be used to determine the presence of a finger and, because a click action comprises tipping the finger on and retracting it from the window, also whether a click action takes place. The periodically modulated measuring beam may be a pulsed measuring beam.

The method using the undulations in the sensor output signal may be combined with the method, which uses the low frequency component in this signal, to increase redundancy and reliability of the measurement.

There are several possibilities to measure the change in operation of the diode laser, which results in several embodiments of the method.

A first embodiment is characterized in that the measuring changes in operation of the laser comprises measuring changes in the impedance of the laser.

The impedance of the diode laser is one of the parameters, which change due to the interference effect and is a function of the relative movement of the input device and the object or finger. This impedance can be measured by measuring the voltage across the diode laser and dividing the measured voltage value by the known value of the electric current sent through the diode laser.

A second and preferred embodiment of the method is characterized in that measuring changes in operation of the laser comprises measuring changes in intensity of radiation emitted by the diode laser.

If radiation is coupled back to the laser cavity by a finger the intensity of the radiation emitted by the diode laser is increased when the laser drive current is kept constant.

The invention also relates to an input device for measuring movement of an object and the input device relative to each other, which movement comprises at least one scroll movement or a click movement, which input device comprises at least one optical sensor unit, which comprises a diode laser having a laser cavity for supplying a measuring beam, optical means for converging the measuring beam at the object and measuring means for measuring changes in operation of the laser, which changes are due to interference of measuring beam radiation reflected by the object and re-entering the laser cavity and the optical wave in this cavity and for supplying an output signal that is dependent on movement of the object relative to the input device. This device is characterized in that the optical sensor comprises additional means, which allows establishing presence of the object on a window of the device.

This input device makes an advantageous use of information available from the sensor unit, which information has not been used before.

The sensor unit may use several types of additional means, either apart or in combination, which combination creates redundancy and increases the reliability of the obtained click movement information.

A first embodiment of the input device is, characterized in that the additional means are constituted by means for a radiation-sensitive detector arranged to receive measuring beam radiation and an electronic low-pass filter, which provide a signal upon occurrence of a click movement.

Whereas in the device of WO 02/37410 for determining a click movement the high frequency portion of the output signal of the sensor units is evaluated, in this embodiment of the device according to the invention use is made of the fact that the low frequency and DC component comprises useful information on the presence of a finger on the device window and thus about a click movement.

A second embodiment of the input device is, characterized in that the additional means are constituted by means for deriving a low-frequency component from the output signal of the measuring means.

Information about click movement is now derived from the detector, for example a monitor diode, which furnishes scroll information, instead of from an additional radiation sensitive detector, so that a component can be saved.

A third embodiment of the input device is characterized in that the additional means are mans for measuring the drive current for the diode laser.

In this embodiment use is made of the fact that the presence of a finger on the input window will cause a reduction of the drive current for the diode laser. By measuring this current, the presence of a finger can be established and thus also whether a click movement takes place.

A fourth embodiment of the input device, wherein the sensor unit is activated by activation pulses and the measuring means perform measurements during time intervals determined by the activation pulses, is characterized in that the additional means comprise counting means and comparing means to establish whether the number of undulations in the output signal measuring during a first and second half of a said time interval are equal.

This embodiment uses the fact that whereas said numbers of undulations in said first and second time interval half are different in case of a scroll movement, they are equal when the finger rests on the window. This will be temporally the case when a click motion is performed.

Also with respect to the sensor output signal, from which click information may be derived according to the invention, different embodiments are possible.

A first of these embodiments is characterized in that the measuring means are means for measuring a variation of the impedance of the laser cavity.

A second of these embodiments is characterized in that the measuring means is a radiation detector for measuring radiation emitted by the laser.

Preferably, this embodiment is further characterized in that the radiation detector is arranged at the side of the laser cavity opposite the side where the measuring beam is emitted.

Diode lasers are standard provided with a monitor diode at their rear side. Usually, such a monitor diode is used to stabilize the intensity of the laser beam emitted at the front side of the diode laser. Now the monitor diode is used to detect changes in the laser cavity, which are generated by radiation of the measuring beam re-entering the laser cavity.

In case measurement of an additional movement is required, the input device may b characterized in that it comprises an additional optical sensor unit for measuring an additional movement in a direction different from the directions of the scroll movement and of the click movement.

The additional optical sensor may be used for measuring a second scroll movement, for example perpendicular to the scroll movement mentioned herein above.

The input device may be used in different applications, such as in mobile phone, a cordless phone, a laptop or handheld computer, a keyboard for a desktop computer, a remote control unit, a write pen or a virtual pen.

These and other aspects of the invention are apparent from and will be elucidated, by way of non-limitative example, with reference to the embodiments described hereinafter. In the drawings.

Figure 1A:
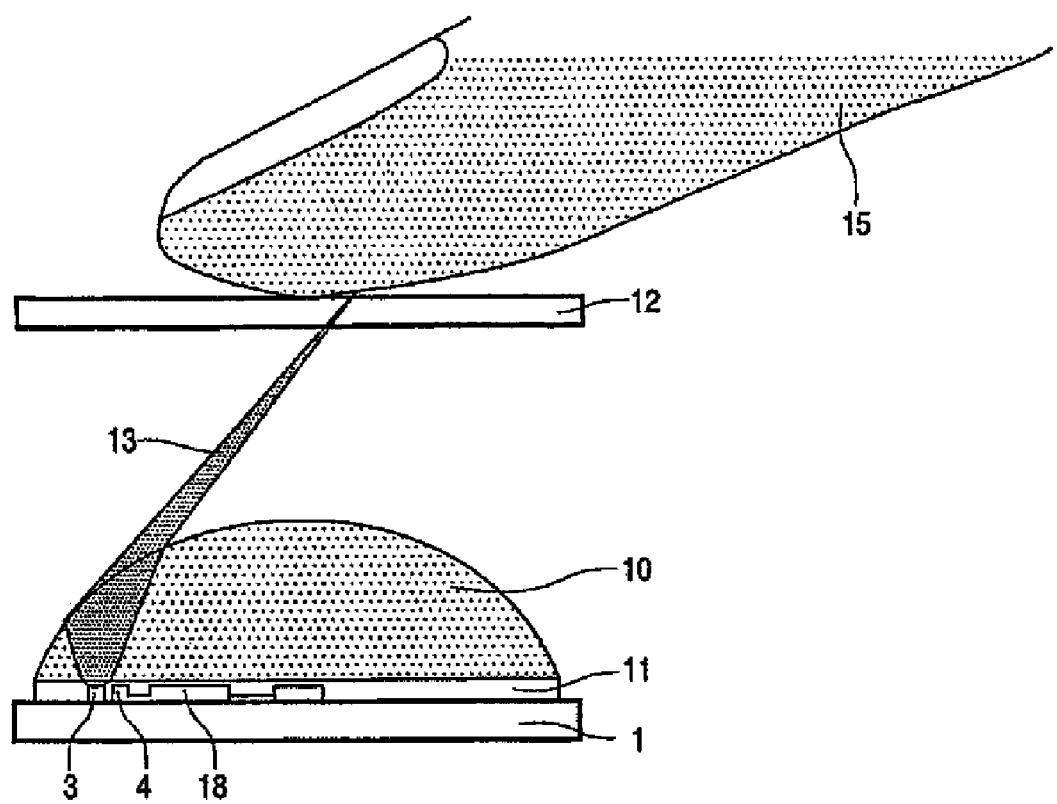
FIG. 1a shows, in cross-section, an embodiment of a known optical input device, which uses the self-mixing effect and wherein the invention can be implemented.

FIG. 1a is a diagrammatic cross-section of an embodiment of the known optical input device. The device comprises at its lower side a base plate 1, which is a carrier for the diode lasers, in this embodiment lasers of the type VCSEL, and the detectors, for example photo diodes. In FIG. 1a only one diode laser 3 and its associated photo diode 4 is visible, but usually at least a second diode laser 5 and associated detector 6 is provided on the base plate, as shown in the FIG. 1b top view of the apparatus. The combination of a diode laser, its associated photodiode and a lens is referred to as a sensor unit. The diode lasers 3 and 5 emit laser, or measuring, beams 13 and 17, respectively At its upper side the device is provided with a transparent window 12 across which an object 15, for example a human finger is to be moved. A lens 10, for example a plane-convex lens is arranged between the diode lasers and the window. This lens focuses the measuring beams 13 and 17 at or near the upper side of the transparent window.

Figure 1B:
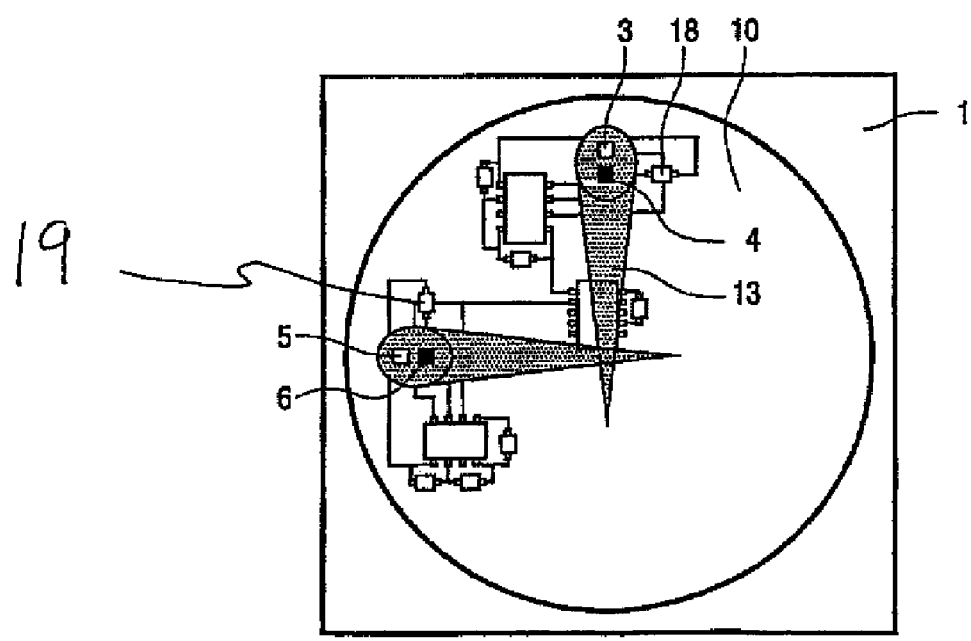
FIG. 1b is a top view of this device.

If an object 15, for example a human finger, is present at this position, it scatters the beam 13. A portion of the radiation of beam 13 is scattered in the direction of the measuring beam 13 and this portion is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which converts the radiation variation into an electric signal, and an electronic circuitry 18 for processing this signal. The measuring beam 17 is also focused on the object, scattered thereby and part of the scattered radiation re-enters the cavity of the diode laser 5. The circuitry 18 and 19, for the signal of the photo diode 6, shown in FIGS. 1a and 1b has only an illustrative purpose and may be more or less conventional. As is illustrated in FIG. 1b, this circuitry is interconnected.

Figure 2:
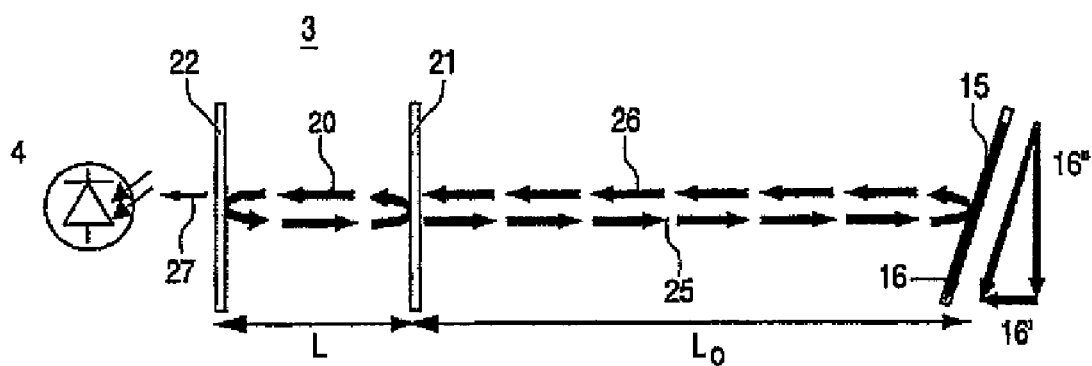
FIG. 2 illustrates the principle of measuring by means of the self-mixing effect.

FIG. 2 illustrates the principle of movement measurement by means of the self-mixing effect. In this FIG., the diode laser, for example diode laser 3, is schematically represented by its cavity 20 whilst its front and rear facets are represented by laser mirrors, 21 and 22, respectively. The cavity has a length L. The object, whose movement is to be measured, is denoted by reference numeral 15. The space between this object and the front facet 21 forms an external cavity, which has a length $L_O$. The laser beam emitted through the front facet is denoted by the reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the measuring beam 25, the reflected radiation 26 undergoes a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the emitted laser radiation is increased or decreased periodically. The frequency of the laser radiation modulation generated in this way is exactly equal to the difference between the frequency of the radiation generated in the cavity and that of Doppler-shifted radiation re-entering the cavity. The frequency difference is of the order of a few kHz to MHz and thus easy to detect. The combination of the self-mixing effect and the Doppler shift causes a variation in the behavior of the laser cavity; especially its gain, or light amplification, varies.

Figure 3:
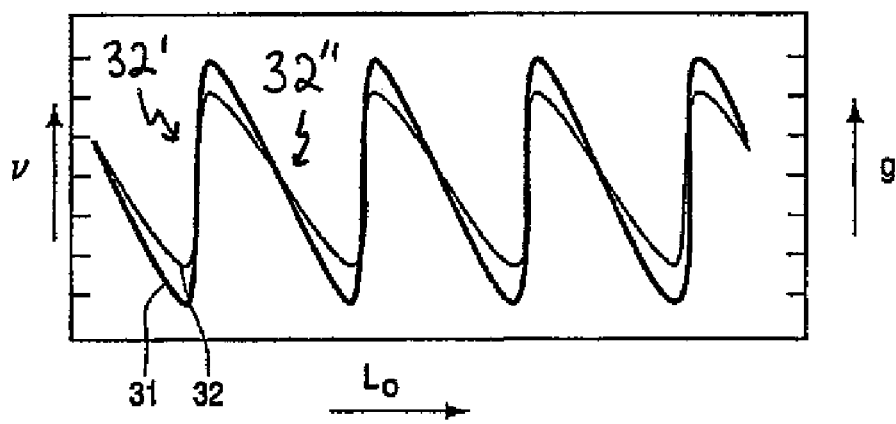
FIG. 3 shows the variation of the optical frequency and of the gain of the laser cavity as a function of the movement of the device and the object relative to each other.

This is illustrated in FIG. 3. In this Fig., curves 31 and 32 represent the variation of the frequency ν of the emitted laser radiation and the variation of the gain g of the diode laser, respectively, as a function of the distance $L_O$ between the object 15 and the front mirror 21. Both ν, g and $L_O$ are in arbitrary units. As the variation of the distance $L_O$ is the result of movement of the object, the abscissa of FIG. 3 can be re-scaled in a time axis, so that the gain will be plotted as a function of time. The gain variation Δg as a function of the velocity v of the object is given by:

$$\Delta g = \frac{-K}{L} \cdot \cos \cdot \left\{ \frac{4\pi \cdot \upsilon \cdot v \cdot t}{c} + \frac{4\pi \cdot L_0 \cdot t}{c} \right\}$$

In this equation:
  K is the coupling coefficient to the external cavity; it is indicative of the quantity of radiation coupled out of the laser cavity;
  ν is the frequency of the laser radiation;
  v is the speed of the object in the direction of the measuring beam
  t denotes time, and
  c is the light velocity.

The object surface is moved in its own plane, as is indicated by the arrow 16 in FIG. 2. Because the Doppler shift occurs only for an object movement in the direction of the beam, this movement 16 should be such that it has a component 16' in this direction. Thereby, it becomes possible to measure a movement in an XZ plane, i.e. the plane of drawing of FIG. 2 which movement can be called the X movement. FIG. 2 shows that the object surface has a skew position with respect to the rest of the system. In practice, usually the measuring beam is a skew beam and the movement of the object surface will take place in an XY-plane. The Y-direction is perpendicular to the plane of the drawing in FIG. 2. The movement in this direction can be measured by a second measuring beam, emitted by a second diode laser, and scattered light of which is captured by a second photo diode associated with the second diode laser. A (the) skew illumination beam(s) is (are) obtained by arranging the diode laser(s) eccentrically with respect to the lens 10, as shown in FIG. 1.

Measuring the variation of the laser cavity gain caused by the object movement by measuring the intensity of the radiation at the rear laser facet by a monitor diode is the simplest, and thus the most attractive way. Conventionally, this diode is used for keeping the intensity of the laser radiation constant, but now it is used for measuring the movement of the object.

Figure 4:
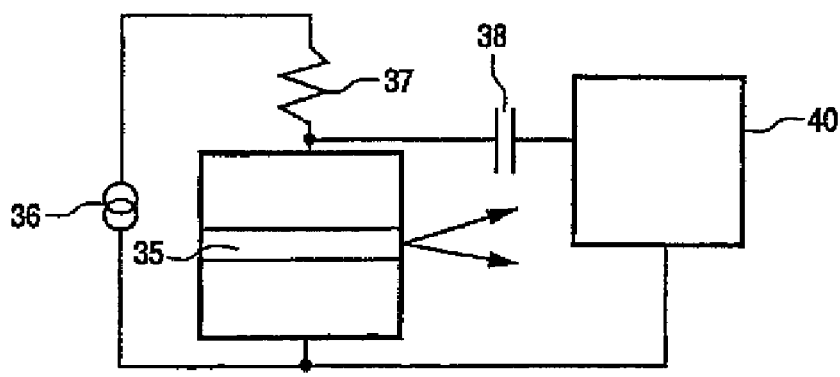
FIG. 4 illustrates a method of measuring this variation.

Another method of measuring the gain variation, and thus the movement of the object, makes use of the fact that the intensity of the laser radiation is proportional to the number of electrons in the conduction band in the junction of the laser. This number in turn is inversely proportional to the resistance of the junction. By measuring this resistance, the movement of the object can be determined. An embodiment of this measuring method is illustrated in FIG. 4. In this Figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms high impedance for the signal across the diode laser.

Besides the amount of movement, i.e. the distance across which the object is moved and which can be measured by integrating the measured velocity with respect to time, also the direction of movement has to be detected. This means that it has to be determined whether the object moves forward or backward along an axis of movement. A first method to determine the direction of movement uses the shape of the signal resulting from the self-mixing effect. As shown by graph 32 in FIG. 3, this signal is an asymmetric signal. The graph 32 represents the situation where the object 15 is moving towards the laser. The rising slope 32' is steeper than the falling slope 32". The asymmetry is reversed for a movement of the object away from the laser, i.e. the falling slope is steeper than the rising slope. By determining the type of asymmetry of the self-mixing signal, the direction of movement of the object can be ascertained.

Figure 5:
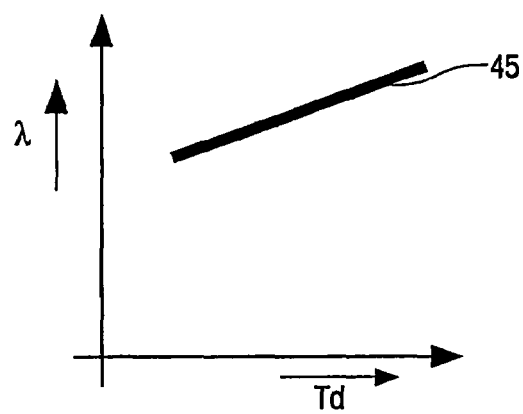
FIG. 5 shows the variation of laser wavelength as a function of the temperature of a laser.

Under certain circumstances, for example for a smaller reflection coefficient of the object or a larger distance between the object and the diode laser, it may become difficult to determine the shape or asymmetry of the self-mixing signal. Therefor, a second method of determining the direction of movement is preferred. The second method uses the fact that the wavelength λ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 5 shows the temperature ($T_d$) dependency of the wavelength λ of the emitted radiation. In this Figure, both the horizontal axis, $T_d$, and the vertical axis, λ, are in arbitrary units.

Figure 6:
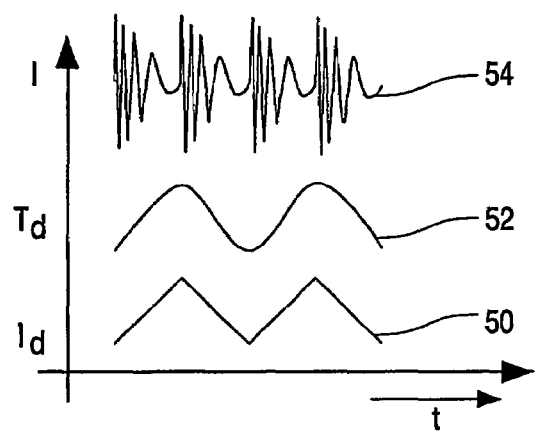
FIG. 6 shows the effect of the use of a periodically varying drive current for a laser.

If, as is shown in FIG. 6, a periodic drive current $I_d$, represented by the graph 50, is supplied to the diode laser, the temperature $T_d$ of the diode laser rises and falls periodically, as shown in graph 52. This results in a standing optical wave in the laser cavity which has a periodically varying frequency and thus a continuously varying phase shift with respect to the radiation reflected by the object and re-entering the cavity with a certain time delay. In every half period of the drive current, there are now successive time segments wherein the diode laser gain is alternately higher and lower, depending on the phase relation of the wave in the cavity and the reflected radiation re-entering the cavity. This results in a time-dependent intensity variation (I), or undulations, of the emitted radiation as shown in graph 54 of FIG. 6. This graph represents the situation for a stationary, or non-moving, object. The number of undulations in a first half period ½p(a) is equal to the number of undulations in a second half period ½p(b).

A movement of the object causes a Doppler shift of the radiation re-entering the laser cavity, i.e. this frequency increases or decreases dependent on the direction of movement. A movement of the object in one direction, the forward direction, causes a decrease of the wavelength of the re-entering radiation, and a movement in the opposite direction causes an increase in the wavelength of this radiation. The effect the periodic frequency modulation of the optical wave in the laser cavity has in case of a Doppler shift depends on the sign of the Doppler shift has relative to the sign of the frequency modulation in the laser cavity. If the two frequency shifts have the same sign, the phase difference between the optical wave and the re-entering radiation changes at a slow rate, and the frequency of the resulting modulation of the laser radiation is lower. If the two frequency shifts have opposite signs, the phase difference between the optical wave and the radiation changes at a faster rate, and the frequency of the resulting modulation of the laser radiation is higher. During a first half period, ½p(a), of the laser driving current, the wavelength of the generated laser radiation increases. In case of a backward moving object, the wavelength of the re-entering radiation also increases, so that the difference between the frequencies of the optical wave in the cavity and that of the radiation re-entering this cavity is lower. Thus the number of time segments during which the wavelength of re-entering radiation is adapted to the wavelength of the generated radiation is smaller than in the case of absence of electrical modulation of the emitted laser radiation. This means that, if the object moves in the backward direction, the number of undulations in the first half period is smaller than if no modulation would be applied. In the second half period, ½p(b), wherein the laser temperature and the wavelength of the generated radiation decrease, the number of time segments wherein the wavelength of the re-entering radiation is adapted to that of the generated radiation increases. Thus, for a backward moving object, the number of undulations in the first half period is smaller than the number of undulations in the second half period. This is illustrated in graph 58 of FIG. 7, which graph shows the intensity $I_b$ of the laser radiation emitted if the object moves in the backward direction. Comparing this graph with graph 54 of FIG. 6 learns that the number of undulations in the first half period has decreased and the number of undulations in the second half period has increased.

Figure 7:
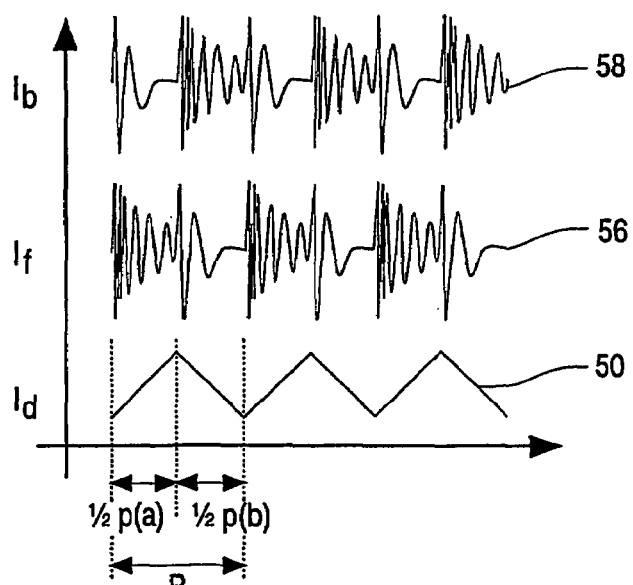
FIG. 7 illustrates how the direction of movement is detected.

It will be clear from the above explanation that if the object moves in the forward direction, in which the wavelength of radiation scattered by the object and re-entering the laser cavity decreases due to the Doppler effect, the number of undulations in a first half period ½p(a) is larger than the number of undulations in a second half period ½p(b). This can be verified by comparing graph 56 of FIG. 7, representing the intensity $I_f$ of the radiation emitted in the case of a forward moving object. In an electronic processing circuit, the number of photo diode signal undulations counted during the second half period ½p(b) is subtracted from the number of undulations counted during the first half periods ½p(a). If the resulting signal is zero, the object is stationary. If the resulting signal is positive, the object moves in the forward direction and if this signal is negative, the object moves in the backward direction.

Instead of the triangular shaped drive current $I_d$ used in the embodiment described with reference to FIGS. 5 and 6, also a drive current of another shape, such as a sinusoidal or rectangular shape, may be used.

The method of measuring the velocity and the direction of the object movement described above can also be used if the gain variation is determined by measuring the variation of the resistance of the diode laser cavity.

The measuring method requires only a small Doppler shift, for example in terms of wavelength, a shift of the order of $1,5.10^{-16}$ m, which corresponds to a Doppler frequency shift of the order of 100 kHz for a laser wavelength of 680 nm.

As hardly any requirements have to be set to the structure or reflection coefficient of the object surface many types of objects can be used to activate the input device. For example, it has been demonstrated that also movement of a piece of paper can be measured with the device.

From an optical point of view, the dimensions of the optical input device, which uses the self-mixing effect is already small. The size of this device, when implemented as a module is mainly determined by the amount of electronics that has to be incorporated in the module and by the aspect of easy manufacturing. For example the window of such a module has a diameter of 3-5 mm. Because of the measuring principle used in this device, its components need not to be aligned accurately, which is great advantage for mass production. By using the present invention a diode laser, which is the most expensive component of the device, can be saved, so that the price and size of the device van be decreased and manufacture becomes easier.

Figure 8:
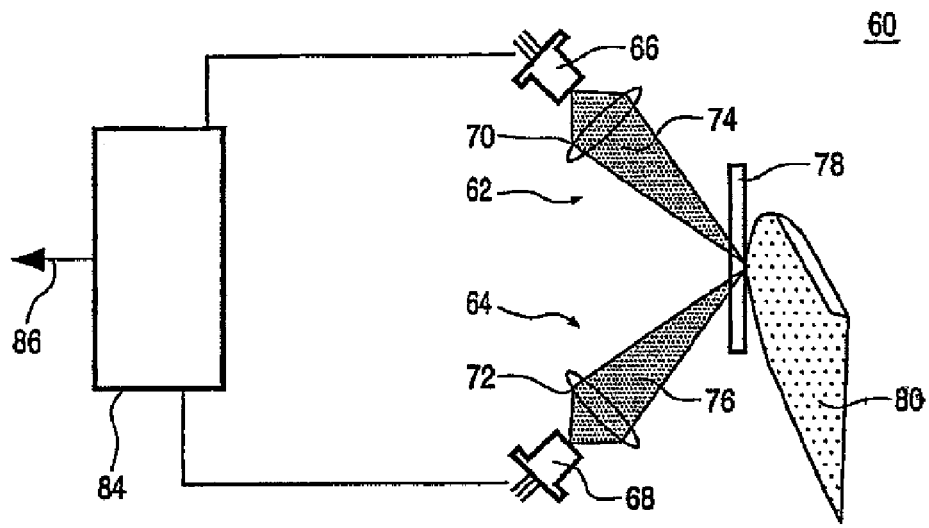
FIGS. 8 and 9 show an embodiment of a known scroll-and-click device.
Figure 10:
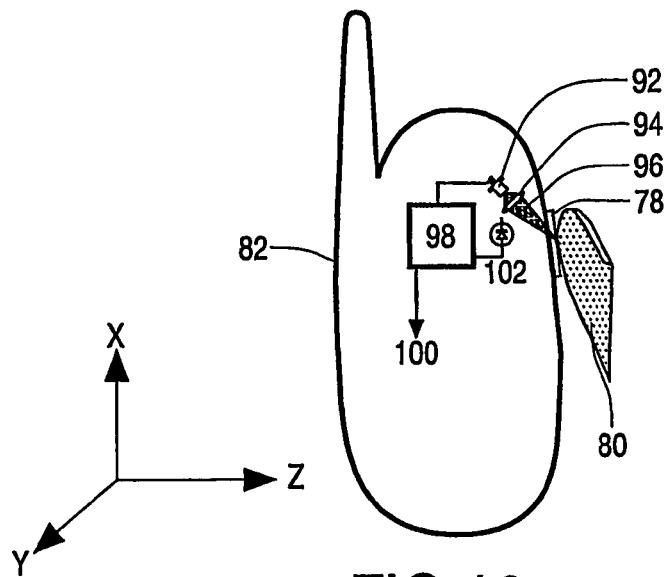
FIG. 10 shows a first embodiment of a scroll-and-click device according to the invention.

In FIG. 8 an embodiment of an optical scroll-and-click input device 60, which is known from WO 02/37410, is shown to compare it with such a device according to the invention, shown in FIG. 10. The device of FIG. 8 comprises two optical sensor units 62,64, each of which may comprise a diode laser and photodiode assembly 66,68. Instead of such an assembly, also separate diode lasers and photo diodes may be used. In each of the paths of the radiation emitted by the units 62,64 a lens 70, 72 is arranged, which focuses radiation beams 74,76 of the associated units 62,64 substantially in an action plane 88, which may be the plane of a window. This window 78 may form part of the housing 82 of the apparatus in which the device is used, for example a mobile phone as shown in FIG. 10. The sensor units may be arranged such that the chief rays of the measuring beams 74,76 are at opposite angles with respect to the normal to the window 82, for example at angles of +45° and -45°, respectively.

Figure 9:
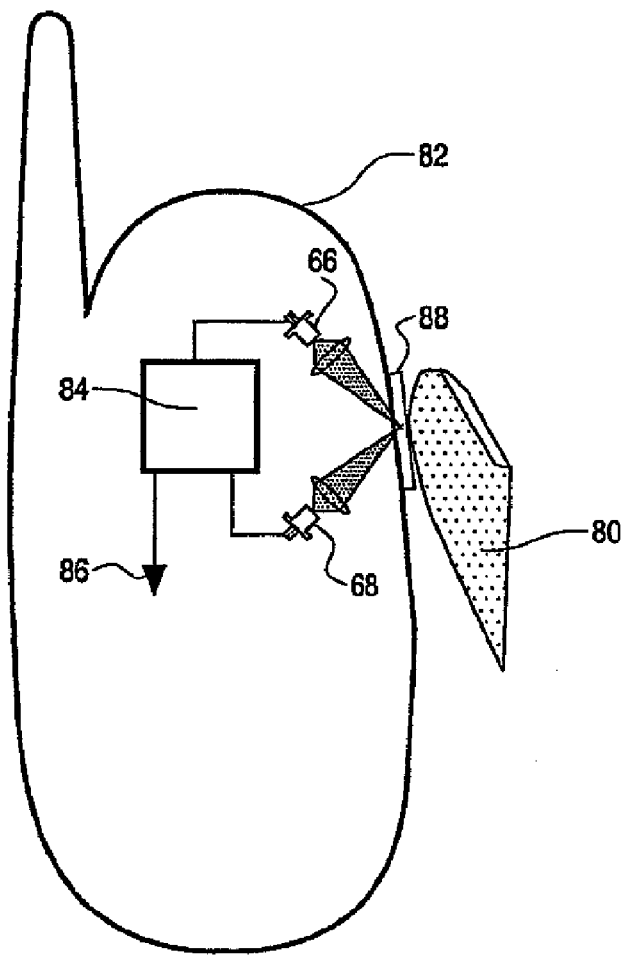

An object, for example a human finger 80 is moved across the action plane for a scrolling and/or clicking action. As described herein above, both actions cause a Doppler shift in the radiation reflected by the finger towards the laser/diode assemblies units 66, 68. The output signals of the detectors of these units are supplied to signal processing and laser drive electronic circuitry 64. This circuitry evaluates the movements of, for example the controlling finger 80 and supplies information about these movements at its output 86. The sensor units 62,64, the window 88 and the electronic circuitry 84 and software may be integrated in one module. This module is placed as such in the mobile phone as shown in FIG. 9, or in another apparatus, which should be provided with a scrolling and clicking function. It is also possible to implement the input device with discrete elements. Especially part of the signal processing may be carried out by a micro controller or other controlling means which forms part of the mobile phone or other apparatus, such as a remote control, a cordless phone or a portable computer.

As described herein before the velocity and direction of a finger movement with respect to the sensor units may be detected by modulating the laser currents and counting the radiation pulses received by the detectors. From the output signals $Sign_1$ and $Sign_2$ of these detectors, which represent velocities of the object along the chief rays of the measuring beams 74,76, the velocity ($V_{scroll}$) parallel to the window and the velocity ($V_{click}$) perpendicular to the window can, for the plus and minus 45° orientation of the measuring beams of FIG. 8, be calculated as follows:

$$V_{scroll} = \tfrac{1}{2}\sqrt{2}\cdot(Sign_1 - Sign_2)$$

$$V_{click} = \tfrac{1}{2}\sqrt{2}\cdot(Sign_1 + Sign_2)$$

The scroll and click movements are thus determined by means of a vector transform of all available directional information, i.e. the signals of all detectors present in the input device.

According to the invention hitherto unused information can be employed to determine the presence of a finger on the window of the device and thus whether a click movement is performed. As this information is of a different nature than scroll movement information, it can be obtained from the sensor unit, which provides information about a scroll movement. This means that a scroll movement and a click movement can be determined by means of only one sensor unit.

FIG. 10 shows an embodiment of an input device 90 according to the invention, used in a mobile phone apparatus 82. The single sensor unit comprises a diode laser and photo diode (monitor diode) assembly 92 and a lens 94 to converge the measuring beam 96 from the diode laser on the window 78 of the input device. The monitor diode is coupled to an electronic circuit 98, which processes the monitor output signal and controls the laser drive current. Reference number 100 denotes the output of this circuit or an interface to control functions of the apparatus outside the input device, like mobile phone menus. As the chief ray of the measuring beam is incident at a sharp angle on the window, it has a component in both the scroll direction X and the click direction Z. A scroll movement and a click movement will both cause a change in the measuring beam radiation reflected back in the diode laser cavity. To determine whether it is a scroll movement or a click movement that causes such a change, it is established whether the finger is resting or has rested on the window during a given time duration. If this is the case, it can be concluded that a click action is performed. For, such an action consist of a fast movement in the Z-direction of the finger toward the window, a window touch of the finger and a fast retracting of the finger from the window.

As remarked herein above, the frequency of the laser radiation modulation, which is due to movement of the finger across the window is in the order of a few kHz to MHz. It has found that in case the finger rests on the window, the laser radiation will also have an amplitude component which varies at a substantially lower frequency, for example lower than 1 kHz. The presence of such a low-frequency component can be detected by means of an additional detector (photo diode), denoted by 102 in FIG. 10, which is arranged such that it receives a portion of the modulated radiation. The amount of radiation incident on the photo diode 102 may be controlled by arranging a beam splitter (not shown), for example a partially reflecting mirror, in the path of the measuring beam. This beam splitter reflects a fixed portion of the measuring beam radiation towards the additional photo diode. The additional photo diode is coupled to the laser drive and signal processing circuit 100. This circuit can thus establish whether a click action does occur or not, thus whether the measured movement is a click movement or a scroll movement.

Figure 11:
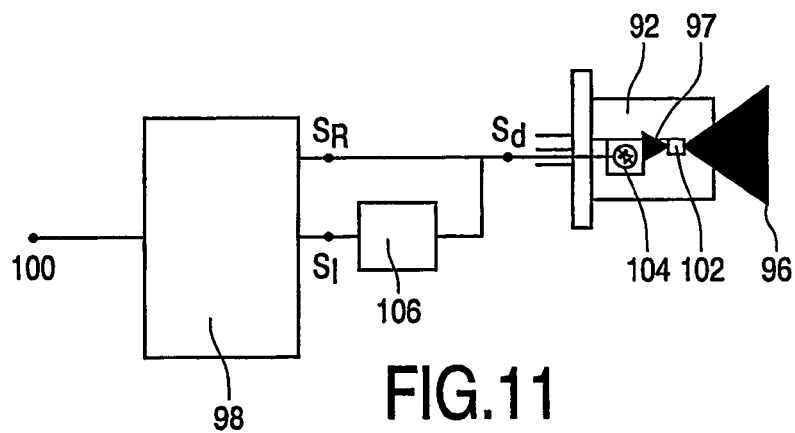
FIG. 11 shows a portion of a second embodiment of a scroll-and-click device according to the invention.

The occurrence of the low frequency radiation modulation can also be detected by means of the monitor diode, as shown in FIG. 11. This Figure shows the assembly 92 comprising the diode laser 104 and the monitor diode 102 for receiving laser radiation 97 emitted at the rear side of the diode laser. Part of the monitor diode signal $S_d$ is supplied to a low pass filter 106 that passes only the low-frequency component $S_1$ to the signal processing circuit 98. The rest of the signal $S_d$ is supplied directly as signal $S_R$ to the circuit 98.

Again, in this circuit it is established whether a click movement occurs or not, i.e. whether a low frequency signal component is present or not, thus whether the measured movement, i.e. the information of $S_R$, is a click movement or a scroll movement. It is also possible to supply the whole signal $S_d$ to the circuit 98 and that this circuit isolates the low frequency component from the signal $S_d$.

During the time that a finger rests on the window an opto-electronic feedback loop exists, which loop encompasses the diode laser and the device window, between which elements measuring beam radiation propagates forth and back, the monitor diode and the laser drive circuit. The effect of coupling back laser radiation in the cavity is that the same amount of radiation is emitted at smaller laser drive electrical current. When a finger is present on the device window the drive current decreases, so that such a presence can be established by measuring this drive current, for example in the circuit of FIG. 4 or a similar circuit well known to a person skilled in the art. The result of such a measurement allows determining whether the movement measured with the monitor diode is a click movement or a scroll movement.

In case a pulsed laser diode laser is used, the presence of a finger on the device window can also be established by means of counting the number of undulations in the detector signal occurring in the first and second half of a laser drive current period. As explained at the hand of FIGS. 6 and 7, the number of undulations in a first half period will be equal to the number of pulses in the second half period if the finger is stationary on the window. In case of a scroll movement these numbers will be unequal. By counting the number of undulations during said half periods and comparing these numbers with each other it can be determined unambiguously whether the finger rests, or has rested on the window. Thus it can be established whether the measured variations in the laser cavity are due to a click movement or to a scroll movement.

Each of the four embodiments of the new method may be combined with one or more of the other embodiments to obtain redundancy and thus to increase the reliability of the measurement. Each of these embodiments may also be used in combination with one the methods of measuring the variations in the laser cavity due to the self-mixing effect and the Doppler shift.

Also in an input device for measuring movement of an object in three directions, for example X- and Y-scroll and click, using a separate sensor unit for each of the directions and described in WO 02/37410, one sensor unit can be saved when using the present method. An input device similar to that shown in FIGS. 1a, 1b or similar to that shown FIGS. 8,9 is then obtained, whereby the chief rays of the measuring beams of the sensor units are oriented such that movements in the X-, Y- and Z direction can be measured. The new method can be used for the two sensor units, so that redundancy is created and reliability increased. Saving a sensor unit, especially a diode laser and photodiode assembly may be of great importance in practice, because a diode laser is the most costly component of the input device. Moreover, saving a sensor unit means that the device can be made more compact and that it becomes easier built-in the device in the envisaged apparatus. It is also possible to use the new method with an input device having the original number of sensor units, for example three. One of the sensor units can be used for measuring a scroll movement in the X direction and a click movement, the second sensor unit can be used for measuring scroll movement in the Y direction and the third sensor unit is available to produce additional information.

With respect to the design aspect, other embodiments of the optical input device than those shown in FIGS. 1a, 1b and in FIGS. 8, 9 are possible, similar to the embodiments described in WO 02/37410. For example, between the diode laser(s) and the window (an) optical fiber(s) may be arranged to guide radiation from the diode laser to the to window and back. Thereby flexibility in design is obtained and the distance between the diode laser and the window can be enlarged, which allows arranging components of the input device those positions in the apparatus, where space is available. The input device is then no longer one module, as is the input device of FIGS. 1a, 1b.

Previous European patent application having filing number 02077217.4 (PHNL020523) describes a new and inventive method of processing the output signals of the sensor units. This method allows an unambiguous discrimination between a scroll movement and a click movement and a very reliable detection of the direction (upward or downward) of a scroll movement. In said method no longer use is made of vector decomposition. Its characteristic features are that scroll movement information and click movement information are derived from the same sensor(s) signal and that analyzing the sensor(s) signal comprises determining whether such a signal shows a first time pattern, which is typical for a click movement, or a second time pattern, which is typical for a scroll action, which first time pattern is different from the second time pattern.

Thereby use is made of the fact that a user will never scroll and click at the same time and of the insight that a click movement generates a sensor unit output signal that is substantially different from such an output signal generated by a scroll movement. The click action is a fast, short duration, movement, which is preceded and succeeded by a period of non-movement and thus generates a burst like response comprising one or more pulses during a short time interval. This specific signal shape is independent of the individual user's finger motorization and the direction of the click (up-click or down-click). A scroll action generates, during the same time period, a considerably larger number of signal undulations having lower peaks than the single burst generated by a click action.

Preferably for analysis of a sensor signal obtained during a given time interval use is made of movement data obtained during other time intervals. Taking past and future measurements into account when analyzing a signal measured during a given, intermediate, time interval allows very reliably determining the direction of a scroll action, i.e. an upward scroll or a downward scroll. Delaying in time the analysis of signals obtained during the said given time interval allows using said future measurements, i.e. measurements done after the said given time interval.

An embodiment of the present method of detecting the presence of a finger, or another object, on the input device window includes the combination of this present method with the method according to the previous EP application having filing number 02077217.4. This combination provides the advantage that, by combining data obtained by means of the two methods the final measuring results are very reliable. For details about the processing of the different signals generated by a scroll action and a click action using the difference in time patterns of these signals and for embodiments of algorithms to perform this processing, reference is made to the previous EP application, which is incorporated herein by reference.

An input device wherein the invention is implemented may not only be used in a mobile, or cellular, phone apparatus, but also in other apparatus of different types, some of which will be discussed briefly.

Figure 12:
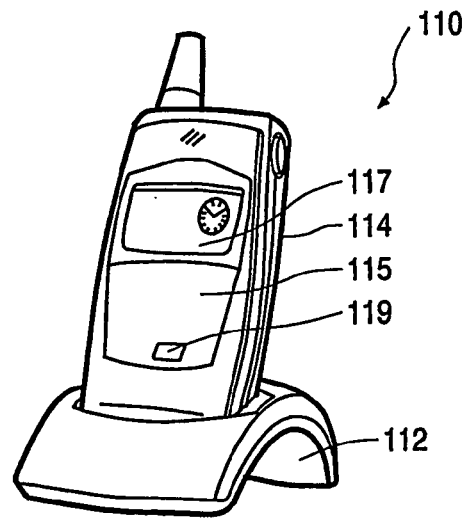
FIG. 12 shows a cordless phone equipped with an input device wherein the invention may be implemented.

FIG. 12 shows a cordless phone apparatus 110 provided with an input device wherein the invention is implemented. This apparatus is composed of a base station 112, which is connected to a phone or cable network and the movable apparatus 114 which can be used within an area with a radius of, for example, less than 100 m from the base station. Apparatus 114 comprises a keyboard section 115 and a display device 117. In a similar way as described for the mobile phone apparatus, the apparatus 114 is provided with a user's input device 119 as discussed herein above. In FIG. 12 only the window of the optical input device is shown. Preferably, in this and the other applications, the window has a convex shape so that the user can easily find the device position, even in poor lighting conditions. Moreover the window is then kept clear by means of finger movements, which wipe dust and grease from the window.

Figure 13:
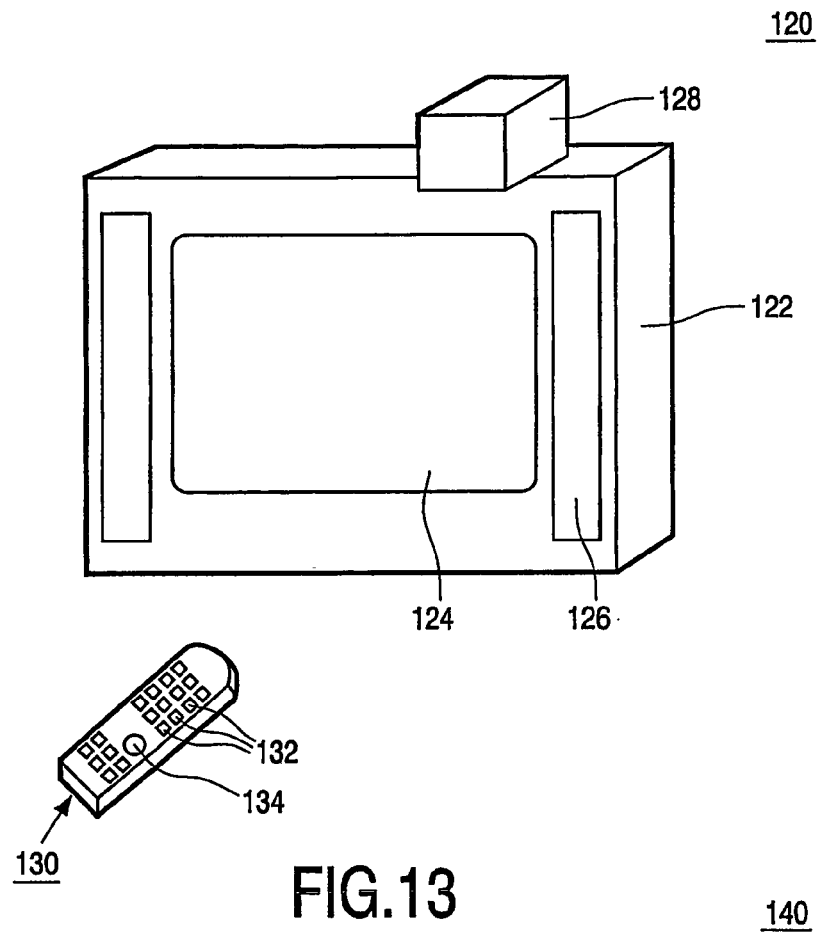
FIG. 13 shows a TV set comprising a remote control equipped with such an input device.

FIG. 13 shows a remote control unit 130 for use with a conventional TV set 120, which comprises a receiver and display apparatus 122 and a set top box 128 to make the apparatus suitable for, for example, Internet communication. This box provides access to the Internet via a phone or cable network, and converts the signal received from the Internet into a signal that can be processed by the TV set in order to display the Internet information. As a user of the TV Internet should have the input device for Internet commands at hand, this input device 134 should be integrated in the remote control unit. The input device 134, wherein the invention may be implemented and of which FIG. 13 shows only the window, may be arranged between the conventional buttons 132 of the remote control unit or at any other position within reach of any of the human fingers holding the remote control unit.

Figure 14:
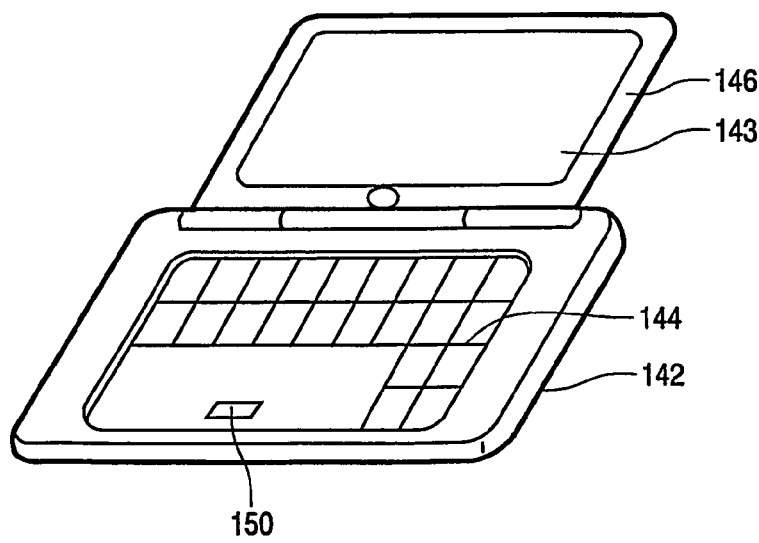
FIG. 14 shows a laptop computer equipped with such an input device.

An input device wherein the invention is implemented may also be used in a computer configuration to replace a conventional hand-driven track-ball mouse or a mouse pad. FIG. 14 shows a portable computer 140, which is known as notebook or laptop, comprising a base portion 142 and a cover portion 146 with a LCD display 143. The base portion accommodates the different computer modules and the keyboard 144. In this keyboard, an optical input device 150 as described herein above is arranged which replaces the conventional mouse pad. The input device may be arranged at the position of the conventional mouse pad or at any other easily accessible position.

A hand-held, for example palmtop, computer is a smaller version of the notebook. Also such a hand-held computer may be provided with an optical input device wherein the invention is implemented, for example to replace a pen for touching the display screen, which pen is usually applied to select a function of a displayed menu. The input device may be arranged in the keyboard of the hand-held computer, but also at the inner side of the cover. A personal digital assistant (PDA) may be considered as a type of hand-held computer so that a PDA or a game computer may also be provided with an input device wherein the invention is implemented.

Figure 15:
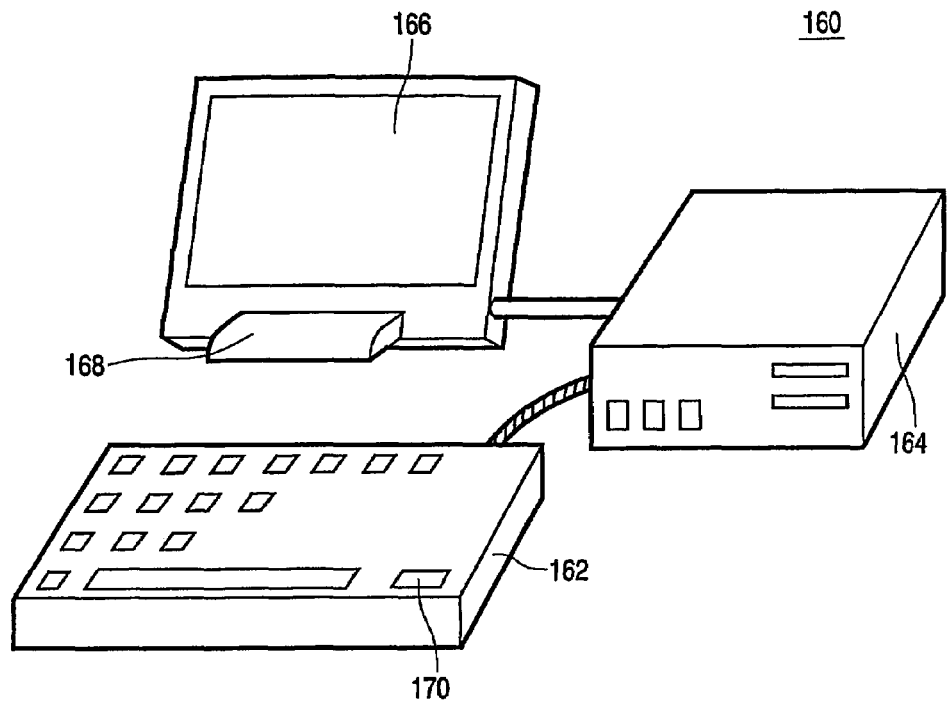
FIG. 15 shows a desktop computer equipped with such an input device.

FIG. 15 shows a desktop computer configuration 160 wherein an optical input device can be applied in several ways to replace the conventional trackball mouse. The computer configuration is composed of a keyboard 162, a computer box 164 and a monitor 166. The monitor may be a flat LCD monitor fixed in a support 168, as shown in the Figure, or a CRT monitor. An optical input device 170 as described herein above is integrated in the keyboard so that a separate mouse and its cable to the computer box are no longer needed.

In the computer configurations described above, the input device may be arranged in the display portion, instead of in the keyboard portion, for example in the cover 146 of the laptop computer of FIG. 14 or in the cover of a hand-held computer. The input device may also be incorporated in displays other than computer displays.

The optical input device may also be incorporated in a normal pen or in a virtual pen to measure the movements of such a pen. In these applications fibers may be used to guide radiation from the diode lasers to the window of the device, so that the main part of the device can be arranged at a position remote from the pen point.

Figure 16:
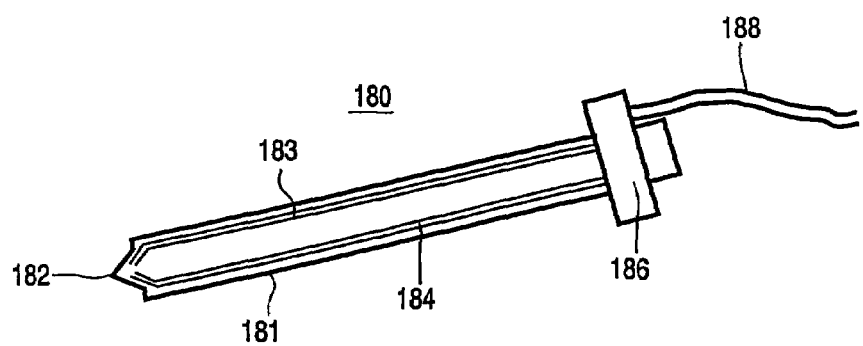
FIG. 16 shows a pen equipped with such an input device.

FIG. 16 shows a normal pen 180 having a penholder 181 and a pen point 182. A sleeve-shaped housing 186 for the components of the input device is fixed on the penholder end opposite the pen point. The housing 186 accommodates the diode lasers, the photo diodes and the electronic circuitry of the input device. Optical fibers 183,184 guide the radiation from the diode lasers. These fibers end, for example, halfway the pen point and their front ends form the window of the input device. It is also possible to arrange the diode lasers and the photo diodes at a position remote from the pen and to transmit the radiation from the diode lasers to the pen point and back to the diode lasers via external optical fibers, the front ends of which are fixed to the pen point.

When the pen is moved for writing a text or making a drawing, the movement is measured by the input device and converted into an electrical signal. This signal is, for example, immediately transmitted to a computer via a wire 188 or wirelessly. The computer processes this signal so that the written text or the drawing can be made visible, immediately or after some time, on the computer display or sent to another computer or archive. The input device of the pen can also be used for measuring a scroll movement or a click movement so that the pen can be used as a computer mouse. A click action can be used for activating the input device of the pen or for choosing another item or function of the pen menu. The pen can also be used in combination with a mobile phone whereby the mobile phone can be used to transmit the text or drawing to a remote location. The pen may also be provided with means for temporally storing the text or graphics produced by the user.

Figure 17:
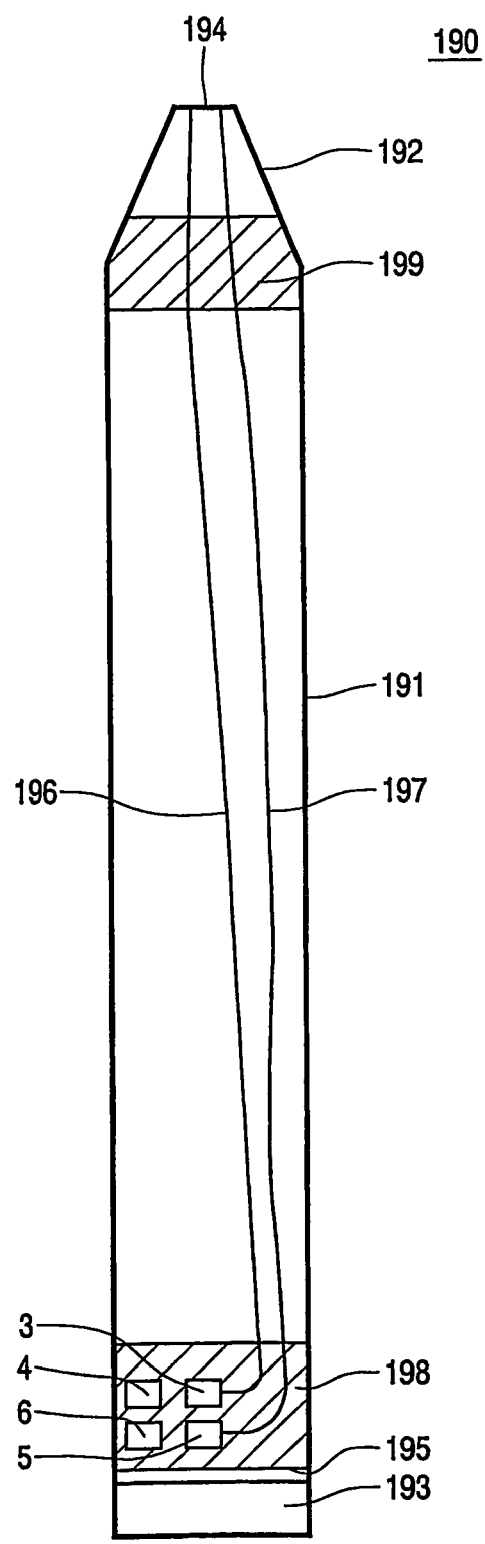
FIG. 17 shows a virtual pen equipped with such an input device.

FIG. 17 shows a vertical cross-section of a virtual pen. Such a pen is moved across featureless paper or another underground according to a required pattern, which may be letters, words, drawings etc. This pattern is translated via the input device of the pen to into positions. A computer program, present in for example a computer or a mobile phone, can translate these positions into a virtual text or drawing. The virtual pattern can be converted into a visual pattern and displayed, immediately or later on, by this computer or sent to another computer or into a network.

The embodiment of the virtual pen 190 shown in FIG. 17 comprises a pen house 191 with a pen point 192, a base plate 193 at the lower side and a transparent window 194 in the pen point. The lower side of the pen accommodates, for example, two diode lasers 3, 4 and the associated photo diodes and signal processing and laser drive circuitry diode. These components may be mounted on a layer 195. Optical fibers 196, 197 are coupled to the diode lasers to guide the laser radiation to the window 194. Jacket or sleeves 198, 199 of solid material, for example, plastics fix these fibers.

The invention claimed is:

1. A method of measuring movement of an object relative to a user input device, wherein the movement comprises at least one of a scroll movement and a click movement, the method comprising the acts of:
    illuminating the object with a measuring laser beam,
    capturing measuring beam radiation reflected by the object;
    measuring changes in the measuring beam radiation;
    outputting an output signal using a single sensor unit;
    separating lower frequencies of the output signal;
    using the lower frequencies for determining both the scroll movement and the click movement;
    deriving scroll movement information and click movement information from the output signal of the single sensor unit; and
    determining whether the output signal shows a first time pattern associated with the click movement, or a second time pattern associated with the scroll movement, wherein the first time pattern is different from the second time pattern.

2. The method as claimed in claim 1, wherein the measuring act determines a presence of the object on a window of the user input device by determining whether the measuring beam radiation comprises an amplitude component which changes at the lower frequencies relative to amplitude changes caused by the scroll movement.

3. The method as claimed in claim 2, wherein the lower frequencies are measured by means of an additional detector.

4. The method as claimed in claim 1, wherein the measuring act determines a presence of the object on a window of the user input device by measuring a variation in an electrical current for driving a diode laser that forms the measuring laser beam.

5. The method as claimed in claim 1, wherein the measuring laser beam is periodically modulated and wherein the measuring act determines a presence of the object on a window of the device by detecting presence of a pattern of the output signal.

6. The method as claimed in claim 1, wherein the determining act uses movement data obtained during other time intervals.

7. The method as claimed in claim 1, wherein the measuring act measures changes in an impedance of a diode laser that forms the measuring laser beam.

8. The method as claimed in claim 1, wherein the measuring act measures changes in an intensity of the measuring beam radiation.

9. An input device for measuring movement of an object relative to the input device, wherein the movement comprises at least one of a scroll movement and a click movement, the input device comprising:
    at least one optical sensor unit configured to:
        measure a measuring beam reflected from the object;
        measure changes in operation of a laser supplying a laser beam, wherein the changes are due to interference of the measuring beam;
        supply an output signal that is dependent on the movement of the object relative to the input device; and
        distinguish a first output signal time pattern associated with the click movement, from a second output signal time pattern associated with the scroll movement;
    a low pass filter configured to filter the output signal to lower frequencies; and
    a processor configured to establish a presence of the object on a window of the input device based on the lower frequencies.

10. The input device as claimed in claim 9, wherein the at least one optical sensor unit is further configured to establish whether a modulation of the measuring beam comprises a component having the lower frequencies than a modulation caused by the scroll movement.

11. The input device as claimed in claim 10, wherein the at least one optical sensor unit is further configured to detect said component.

12. The input device as claimed in claim 9, wherein the at least one optical sensor unit is further configured to measure variations in the measuring beam.

13. The input device as claimed in claim 9, wherein the at least one optical sensor unit is further configured to measure a drive current for the laser.

14. The input device as claimed in claim 9, further comprising storage and delaying means for combining measuring results obtained at different time intervals.

15. The input device as claimed in claim 9, wherein the at least one optical sensor unit is further configured to measure a variation of an impedance of the laser.

16. The input device as claimed in claim 9, wherein the at least one optical sensor unit includes a radiation detector for measuring radiation emitted by the laser.

17. The input device as claimed in claim 16, wherein the radiation detector is arranged at a first side of the laser which is opposite a second side where the measuring beam is emitted.

18. The input device as claimed in claim 9, further comprising an additional optical sensor unit for measuring an additional movement in a direction different from directions of the scroll movement and the click movement.

19. A mobile phone apparatus comprising the input device as claimed in claim 9.

20. A cordless phone apparatus comprising the input device as claimed in claim 9.

21. A laptop computer comprising the input device as claimed in claim 9.

22. A hand-held computer comprising the input device as claimed in claim 9.

23. A write pen comprising the input device as claimed in claim 9.

24. A virtual pen comprising the input device as claimed in claim 9.

25. A keyboard for a desktop computer wherein the input device as claimed in claim 9 is integrated.

26. A remote control for a TV set, comprising the input apparatus as claimed in claim 9.

27. An input device for measuring movement of an object relative to the input device, wherein the movement comprises at least one of a scroll movement and a click movement, the input device comprising:

at least one optical sensor unit configured to:
        measure a measuring beam reflected from the object;
        measure changes in operation of a laser supplying a laser beam, wherein the changes are due to interference of the measuring beam; and
        supply an output signal that is dependent on the movement of the object relative to the input device;
    a low pass filter configured to filter the output signal to lower frequencies; and
    a processor configured to establish a presence of the object on a window of the input device based on the lower frequencies;
    wherein the at least one optical sensor unit is activated by activation pulses and is further configured to perform measurements during a time interval determined by the activation pulses, the at least one optical sensor unit being further configured to count and compare a number of undulations of the measuring beam to establish whether the number of undulations measured during a first half and a second half of said time interval are equal.

28. A method of measuring movement of an object relative to a user input device, wherein the movement comprises at least one of a scroll movement and a click movement, the method comprising the acts of:

measuring a measuring beam reflected from the object;
    measuring changes in operation of a laser supplying a laser beam, wherein the changes are due to interference of the measuring beam;
    supplying an output signal that is dependent on the movement of the object relative to the user input device;
    filtering the output signal to obtain low frequencies; and
    establishing a presence of the object on a window of the input device based on the low frequencies; and
    activating at least one optical sensor unit by activation pulses to perform measurements during a time interval determined by the activation pulses, the at least one optical sensor unit being configured to count and compare a number of undulations of the measuring beam to establish whether the number of undulations measured during a first half and a second half of said time interval are equal.

* * * * *